July 28, 1931.  R. J. MINSHALL  1,816,228
SLIDING OLEO LANDING HOOK
Filed March 16, 1931
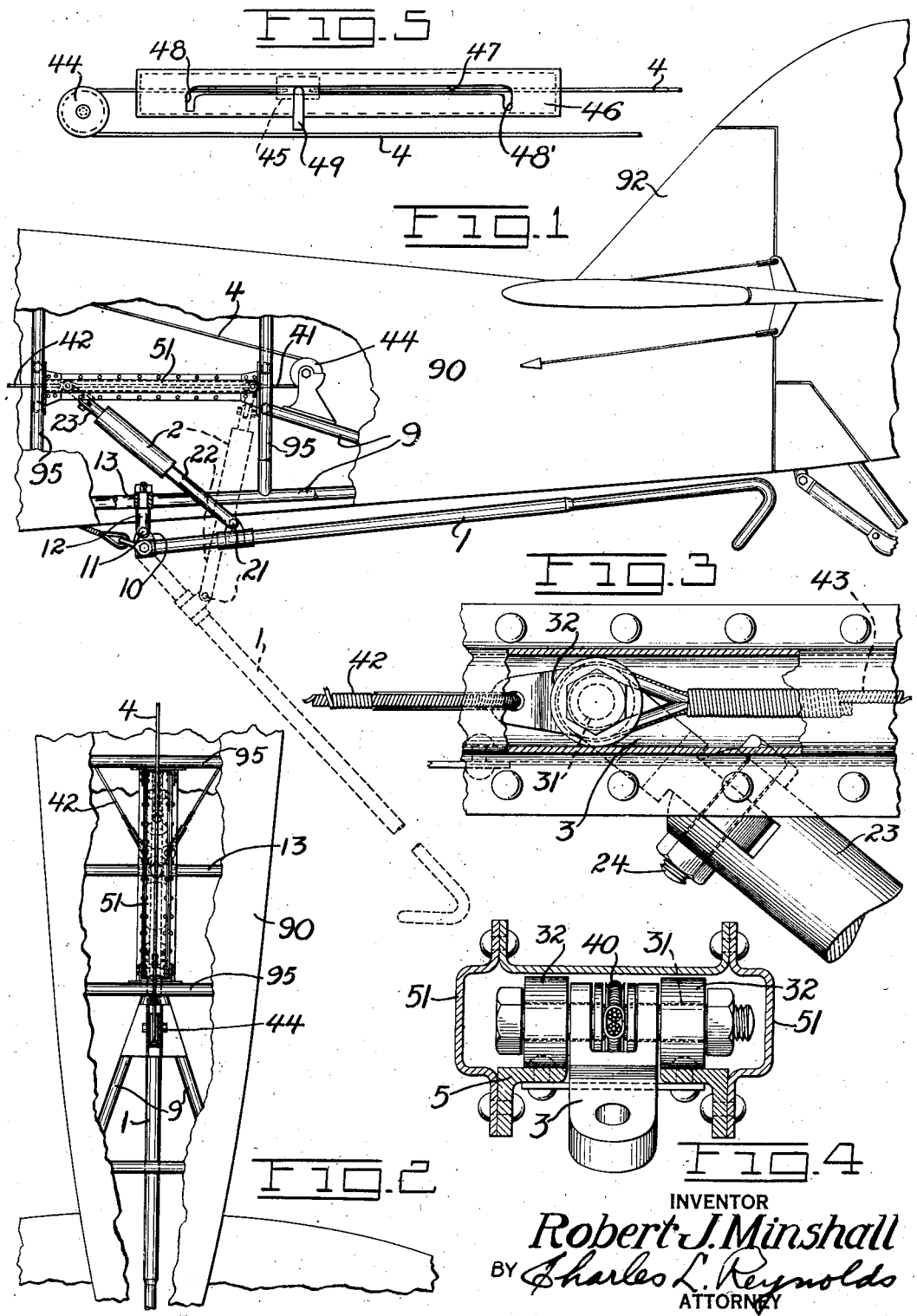
INVENTOR
Robert J. Minshall
BY Charles L. Reynolds
ATTORNEY Patented July 28, 1931

1,816,228

UNITED STATES PATENT OFFICE

ROBERT J. MINSHALL, OF SEATTLE, WASHINGTON, ASSIGNOR TO BOEING AIRPLANE COMPANY, OF SEATTLE, WASHINGTON, A CORPORATION OF WASHINGTON

SLIDING OLEO LANDING HOOK

Application filed March 16, 1931. Serial No. 523,006.

My invention relates to devices for arresting the forward movement of airplanes in landing upon a space of restricted length, such means on the airplane being intended for engagement with complemental arresting means upon the landing space.

The present invention is an improvement over that shown in my Patent No. 1,749,438, dated March 4, 1930. The particular difference resides in the provision of a shock absorbing device which is itself the means directly supporting the hook in operative position, in such a way that it will yieldingly resist a tendency to throw the landing hook from downwardly depending operative position upon contact with any object, preventing damage to the airplane by the hook being thrown up against it, and will also react quickly to return the landing hook into full operative position after it has yielded in response to a strong momentarily-acting force, but which may be shifted bodily and quickly by the pilot, with little effort, to retract the hook at will from projected or full operative position.

My invention comprises the novel parts and and the novel combination and arrangement thereof, as shown in the accompanying drawings, described in this specification, and as will be more particularly pointed out by the claims which terminate the same.

In the accompanying drawings I have shown my invention in a form which is at present preferred by me.

Figure 1 is an elevation of the tail end of a fuselage, parts being broken away to illustrate my invention arranged therein.

Figure 2 is a plan view of the structure shown in Figure 1, parts being broken away.

Figure 3 is an elevation, with parts broken away, and Figure 4 is a transverse section, through the guide means for controlling movement of the upper end of the compressible brace member.

Figure 5 is an elevation of the pilot's control device for the hook.

The fuselage structure 9, its covering 90, and tail assembly, generally indicated at 92, are, or may be, of any conventional design. Adjacent the tail is supported one end of a landing hook 1. This end may be provided with a lug 10, which is pivoted at 11, upon a transverse axis, to a depending pin 12, which is in turn swiveled upon an upright axis within a block 13 supported from the fuselage 9. The hook 1 may thus swing in a vertical plane and may swivel upon an upright axis.

A compressible brace member, such as the oleo shock absorbing unit, known in the art, is indicated at 2. The lower end or piston rod 22 of this unit is connected, as by a pin 21, to the shank of the arresting hook 1. The other end or cylinder of the oleo unit is mounted for movement within and relative to the fuselage. The connection is best illustrated in Figures 3 and 4. The upper end 23 of the oleo unit is connected to a head 3 by a pivot pin 24, whereby the oleo unit may swing laterally as the hook swivels upon the pin 12. The head 3 carries a cross pin 31, upon which are secured rollers 32, and to which pin are secured loops 40 of an endless line 4, the two portions 41 and 42 of which are shown in Figures 1 and 3. The rollers ride upon longitudinally extending tracks such as the angles 5, which are conveniently supported from the fuselage 9, as for instance, between two vertical members 95 thereof. The arrangement may be suitably encased by the side plates 51.

The cable extends about guide pulleys 44 within the fuselage, to a point within convenient reach of the pilot, where it is provided with means whereby the pilot may move it lengthwise of the cable to shift the head 3 from forward to a rear position, or vice versa. Preferably, this is accomplished by means of a block 45 to which the cable is connected, slidable within a tube 46, the tube being slotted, as indicated at 47, the ends of this slot being angularly directed, as indicated at 48 and 48'. A handle 49, secured in the block 45 and projecting through the slot 47, is engageable in the angular portions 48 or 48' to maintain the block 45, and consequently the head 3, in one of the two limiting positions.

With parts in the position shown in full lines in Figure 1, the oleo unit 2 is inclined forwardly, and the hook 1 is held upward in a retracted or inoperative position, and it will not drop therefrom since the oleo unit is expanded, with the rod 22 projected from the cylinder under the influence of the weight of the hook. However, when parts are moved to the dotted line position of Figure 1, by movement of the handle 49 rearwardly, the oleo unit is braced in a rearwardly inclined position, and the hook is in downwardly depending operative position. Should it strike an object in landing with a force such as would tend to throw it upward, the oleo unit 2 will yield to a sufficient extent, but will not permit the hook to be thrown back against the fuselage, and will promptly react to again position the arresting hook in operative position and to hold it there, dampening any tendency to vibrate. As the airplane settles down, the oleo unit will yield and compress under the weight of the tail.

If for any reason the pilot, after dropping the hook into operative position, should decide that he does not wish to land, he can promptly retract the hook by shifting the block 45 forward. Thus he avoids the danger of fouling the arresting means on the landing space when he is not prepared to land. The action must be rapid, to avoid the possibility of fouling, and in using the device of my former patent, because it was necessary for the pilot to compress the oleo unit in order to retract the hook, at a critical time the pilot had to apply a strong force to compress the unit as quickly as possible, meanwhile zooming upward. In the present device, since the oleo unit is expanded, it acts merely as a tension unit, and is not compressed in the act of retracting it. The oleo unit is only compressed when the hook engages some object tending to throw it upward.

After the craft has come to rest and the hook has been disengaged from the arresting means on the landing space, the block 45 may be again moved forward, this action drawing the head 3 forward and restoring parts to the full line positions of Figure 1. The oleo unit, upon being relieved of the stresses tending to compress it, will resume its normal expanded position, but will not permit the hook to drop.

What I claim as my invention is:—

1. In combination with an aircraft fuselage, an arresting hook supported thereon for movement from an upwardly withdrawn inoperative position into a downwardly depending operative position, a compressible brace member connecting the shank of the hook with the fuselage, and means controllable by the pilot to shift said brace member relative to the fuselage, thereby to move said hook from or into operative position.

2. In combination with an aircraft fuselage, an arresting hook swingably supported thereon by one end for movement of the hooked end from an upper inoperative position into a downwardly depending operative position, a movement-dampening device connected by one end to the shank of the hook, and supported at its other end in the fuselage for movement, and means controllable by the pilot to shift said brace member, thereby to swing said hook from or into operative position.

3. The combination of claim 2, the lower end of the dampening device being secured to the hook, and its upper end being guided for movement longitudinally of the fuselage from an upright position, corresponding to operative position of the hook, to a forwardly and upwardly inclined position, corresponding to inoperative position of the hook.

4. The combination of claim 1, the compressible brace member acting yieldably to resist upward throwing of the hook from operative position.

5. In combination with an aircraft fuselage, a longitudinally extending guide means adjacent the tail, an oleo unit having its upper end slidably received in said guide, a landing hook pivoted upon a transverse axis beneath the guide means, for swinging vertically, and the lower end of the oleo unit being connected to the landing hook, to resist an upward throw thereof.

6. In combination with an aircraft fuselage, a longitudinally extending guide means adjacent the tail, an oleo unit having its upper end slidably received in said guide, a landing hook pivoted upon a transverse axis beneath the guide means, for swinging vertically, and the lower end of the oleo unit being connected to the landing hook, to resist an upward throw thereof, and means operable by the pilot to slide the upper end of the oleo unit between two limiting positions, corresponding to operative and to inoperative positions of the landing hook.

7. In combination with an aircraft fuselage, an arresting hook pivotally supported thereon to swing upward into retracted position and downward into operative position, a compressible shock absorbing unit secured at one end to said hook, and means controlled by the pilot for shifting its upper end in a fixed path to project the hook downward into operative position.

8. The combination of claim 7, the arresting hook being mounted to swivel upon an upright axis, and the shock absorbing unit being likewise supported for lateral swinging movement.

Signed at Seattle, King County, Washington, this 11th day of March, 1931.

ROBERT J. MINSHALL.